(12) United States Patent
Han et al.

(10) Patent No.: US 10,802,755 B2
(45) Date of Patent: Oct. 13, 2020

(54) METHOD AND MANAGER FOR MANAGING STORAGE SYSTEM

(71) Applicant: EMC IP Holding Company, Hopkinton, MA (US)

(72) Inventors: Geng Han, Beijing (CN); Jian Gao, Beijing (CN); Jibing Dong, Beijing (CN); Xinlei Xu, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 328 days.

(21) Appl. No.: 15/955,004

(22) Filed: Apr. 17, 2018

(65) Prior Publication Data

US 2018/0300086 A1 Oct. 18, 2018

(30) Foreign Application Priority Data

Apr. 17, 2017 (CN) .......................... 2017 1 0250593

(51) Int. Cl.
*G06F 12/00* (2006.01)
*G06F 3/06* (2006.01)
*G06F 12/0891* (2016.01)
*G06F 11/10* (2006.01)

(52) U.S. Cl.
CPC .......... *G06F 3/0659* (2013.01); *G06F 3/061* (2013.01); *G06F 3/064* (2013.01); *G06F 3/0632* (2013.01); *G06F 3/0685* (2013.01); *G06F 3/0689* (2013.01); *G06F 11/1064* (2013.01); *G06F 12/0891* (2013.01); *G06F 2212/1041* (2013.01); *G06F 2212/608* (2013.01)

(58) Field of Classification Search
None
See application file for complete search history.

(56) References Cited

U.S. PATENT DOCUMENTS

| 6,775,794 B1* | 8/2004 | Horst .................. G06F 11/1092 711/114 |
| 10,089,012 B1* | 10/2018 | Chen ....................... G06F 3/061 |
| 10,089,015 B1* | 10/2018 | Gao ......................... G06F 3/061 |
| 2015/0212736 A1* | 7/2015 | Fenske ..................... G06F 3/061 711/166 |
| 2017/0109092 A1* | 4/2017 | Yoshioka .............. G06F 3/0607 |

* cited by examiner

*Primary Examiner* — Baboucarr Faal
(74) *Attorney, Agent, or Firm* — BainwoodHuang

(57) ABSTRACT

A method and a manager for managing a storage system including a manager and a storage device. The storage device includes a data region and a metadata region. The data region is divided into data blocks. The metadata region stores metadata describing zeroing states of the data blocks. The method comprises allocating a metadata cache in a memory of the manager. The metadata cache includes respective zeroing indication bits indicative of the zeroing states of the corresponding data blocks. The allocating procedure comprises allocating a user data cache for reading or writing user data and allocating a background zeroing cache for a background zeroing operation of the storage device. The method further comprises, in response to receiving an I/O request for the storage system, processing the I/O request with the metadata cache.

20 Claims, 13 Drawing Sheets

METHOD AND MANAGER FOR MANAGING STORAGE SYSTEM

RELATED APPLICATIONS

This application claim priority from Chinese Patent Application Number CN201710250593.0, filed on Apr. 17, 2017 at the State Intellectual Property Office, China, titled "METHOD AND MANAGER FOR MANAGING STORAGE SYSTEM" the contents of which is herein incorporated by reference in its entirety.

FIELD

Embodiments of the present disclosure relate to a storage system, and more specifically to a method and a manager for managing a storage system.

BACKGROUND

At present, many kinds of data storage systems based on redundant arrays of disks have already been developed to improve data reliability. When one or more disks in a storage system malfunctions, data in the malfunctioning disk may be restored from other normally-operating disks. Zeroing operation is performed for a disk during initialization of the redundant arrays of disks, whereupon it is necessary to coordinate a user's data read/write operations for the disk and background zeroing procedure for the disk.

SUMMARY

Embodiments of the present disclosure provide a method and a manager for managing a storage system, and a computer program product.

According to a first aspect of the present disclosure, there is provided a method of managing a storage system. The storage system includes a manager and a storage device. The storage device includes a data region and a metadata region. The data region is divided into data blocks. The metadata region stores metadata describing zeroing states of the data blocks. The method comprises allocating a metadata cache in a memory of the manager. The metadata cache includes respective zeroing indication bits indicative of the zeroing states of the corresponding data blocks. The allocating procedure comprises allocating a user data cache for reading or writing user data and allocating a background zeroing cache for a background zeroing operation of the storage device. The method further comprises, in response to receiving an I/O request for the storage system, processing the I/O request with the metadata cache.

According to a second aspect of the present disclosure, there is provided a manager for managing a storage system. The storage system includes a manager and a storage device. The storage device includes a data region and a metadata region. The data region is divided into data blocks. The metadata region stores metadata describing zeroing states of the data blocks. The manager includes a processor and a memory coupled to the processor. The memory has instructions stored therein. The instructions, when executed by the processor, cause the manager to perform acts. The acts include allocating a metadata cache in the memory. The metadata cache includes zeroing indication bits indicative of the zeroing state of the corresponding data blocks. The allocating procedure comprises allocating a user data cache for reading or writing user data and allocating a background zeroing cache for a background zeroing operation of the storage device. The acts further include, in response to receiving an I/O request for the storage system, processing the I/O request with the metadata cache.

According to a third aspect of the present disclosure, there is provided a computer program product being tangibly stored on a non-transient computer readable medium and comprising machine-executable instructions. The machine-executable instructions, when being executed, cause a machine to perform the method described according to the first aspect of the present disclosure.

This Summary is provided to introduce a selection of concepts that will be further described in Detailed Description of Embodiments below. This Summary is not intended to identify key features or essential features of the present disclosure or limit the range of the present disclosure.

BRIEF DESCRIPTION OF THE DRAWINGS

The above and other objectives, features, and advantages of example embodiments of the present disclosure will become more apparent from the following detailed description with reference to accompanying drawings, in which the same reference symbols refer to the same elements.

DETAILED DESCRIPTION OF EMBODIMENTS

Figure 1:
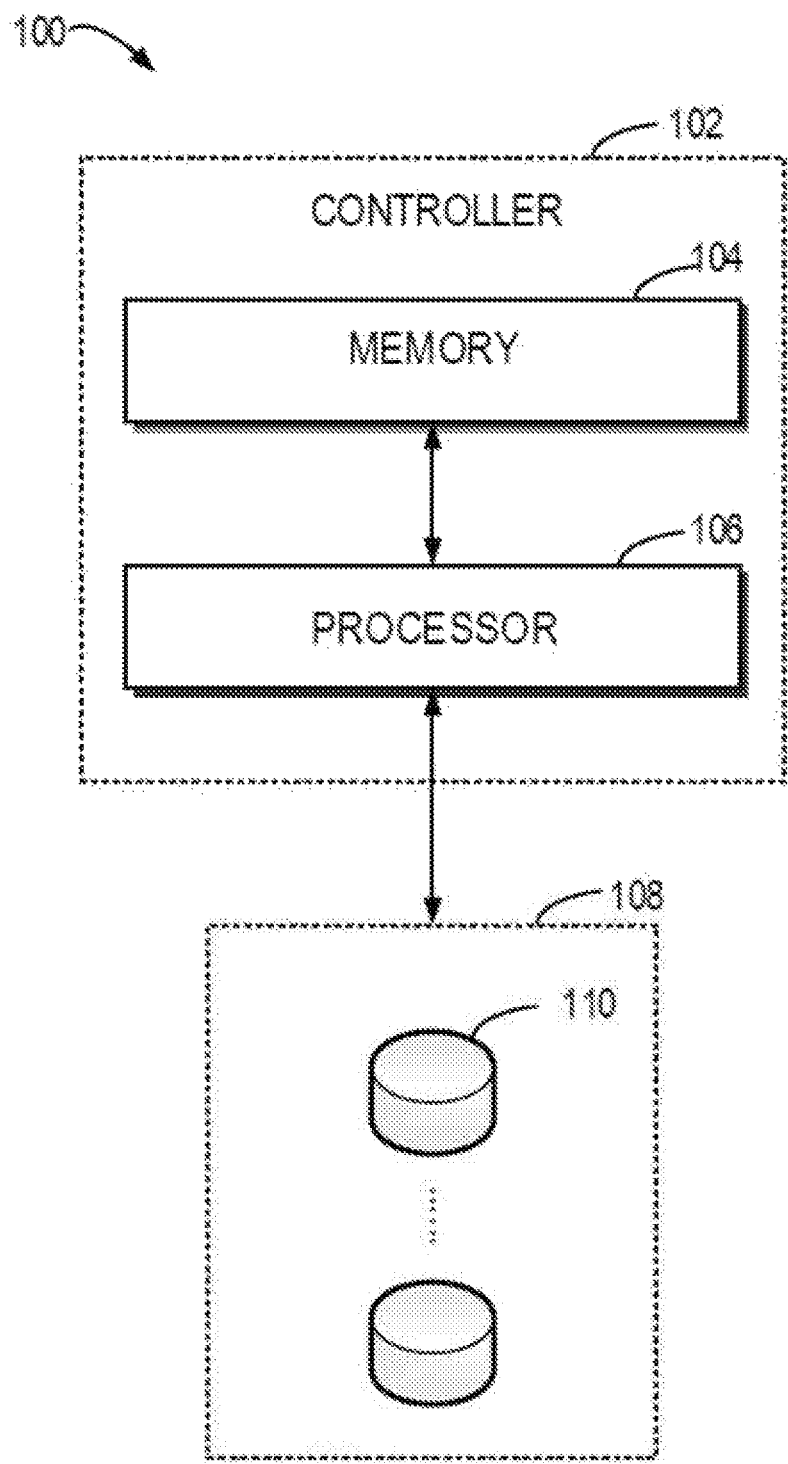
FIG. 1 illustrates a block diagram of a storage system according to an embodiment of the present disclosure.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the range of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one another implementation." Terms "a first", "a second", and others can denote different or identical objects. The following text may also contain other explicit or implicit definitions.

The storage system in the text may be Redundant Array of Independent Disks RAID. The RAID may combine a plurality of storage devices together to form a disk array. Redundant storage devices are provided to allow reliability of the whole disk to substantially exceed a single storage device. The RAID may provide various advantages superior to a single storage device, for example, enhancing data integration, improving fault-tolerant function, increasing throughput or capacity and the like. With development of storage devices, RAID undergoes multiple standards, for example, RAID-1, RAID-10, RAID-3, RAID-30, RAID-5 and RAID-50. An operating system may consider a disk array comprised of multiple storage devices as a single logic storage unit or disk. With the disk array being divided into a plurality of strips, data may be distributed to multiple storage devices, thereby achieving low delay and high bandwidth, wherein partial disks, after damages, may restore data to a certain degree. Of course, it should be appreciated that embodiments of the present disclosure are not limited to RAID. The spirit and principles taught here may also be adapted for any other storage systems having multiple storage controllers, no matter currently known or to be developed in the future. RAID is taken as an example below to describe embodiments of the present disclosure only to facilitate understanding solutions of the present disclosure, not to limit the range of the present disclosure in any way.

Zeroing operation is performed on the disk during initialization of the redundant arrays of disks, whereupon it is necessary to coordinate user's data read/write operations for the disk and background zeroing procedure for the disk. In the case that the disk storage capacity is very large, zeroing takes long time, which causes impact to the user's read/write operations. Performing zeroing operation on demand enables disk regions to be read/written by the user to perform zeroing according to needs. Performing zeroing operation on demand introduces a problem of I/O increase or amplification. Regarding each read or write operation in the disk region, metadata on the disk needs to be accessed for at least one time, which reduces user I/O performance. Furthermore, if the read/write positions are far away from each other, disk average seek time will be greatly increased, which appears more obvious when metadata is placed at an end of the disk.

To at least partially solve the above problems and other potential problems, an exemplary embodiment of the present disclosure provides a solution of managing the storage system. In the solution of the present disclosure, metadata cache is allocated in the memory to expedite zeroing on demand and background zeroing. An effect of expediting zeroing on demand and background zeroing is achieved in the following manner: reducing metadata reads, reducing average disk header seek time and reducing on disk metadata I/O. The solution of the present disclosure may substantially reduce the impact exerted by disk zero to the user's I/O.

FIG. 1 illustrates a block diagram of a storage system according to an embodiment of the present disclosure. It should be appreciated that the structure and function of the storage system 100 are described only for exemplary illustration purpose, not to suggest any limitations to the range of the present disclosure. That is, some components in the storage system 100 may be omitted or replaced. Some other components that are not shown may be added to the storage system 100. Embodiments of the present disclosure may be embodied in different structures and/functions.

As shown in FIG. 1, the storage system 100 comprises a manager 102 and a storage device 108. In some embodiments, the manager 102 is a server. The manager 102 comprises a memory 104 and a processor 106. The memory 104 is coupled with the processor 106. As a non-restrictive implementation mode, the memory may be a volatile memory such as Double Data Rate memory, a Dynamic Random Access Memory DRAM or a Static Random Access Memory SRAM. The storage device 108 comprises a plurality of disks 110. In some embodiments, the disks 110 may be Hard Disk Drives HDD or Solid State Drives SSD. It should be appreciated that although FIG. 1 only exemplarily shows two disks 110, the storage device 108 may comprise more than two disks 110.

Figure 2:
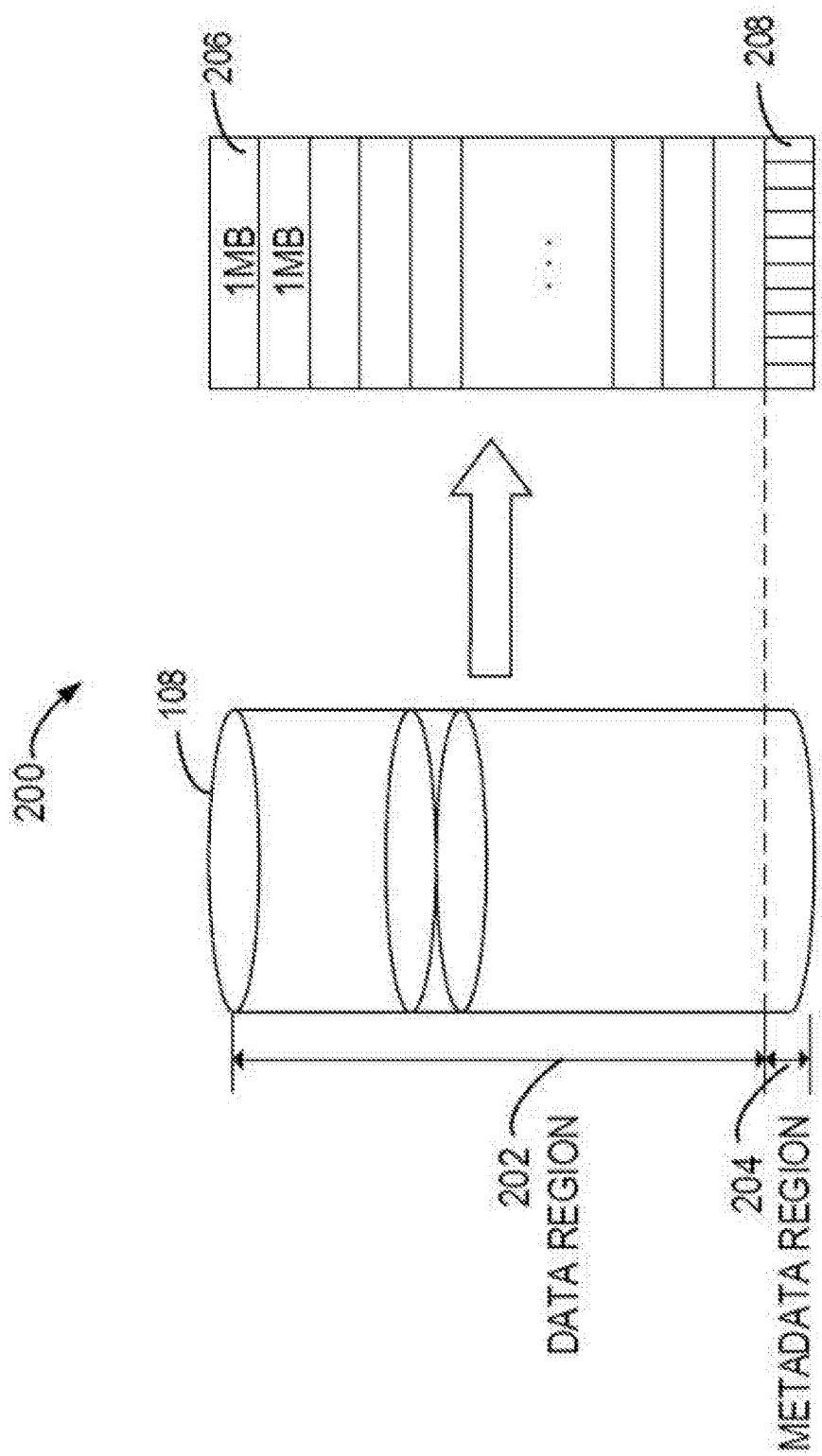
FIG. 2 illustrates a schematic diagram of a storage device according to an embodiment of the present disclosure.

FIG. 2 shows allocation of the storage device 108. The storage device 108 comprises a data region 202 and a metadata region 204. The data region is divided into data blocks 206 of a predetermined size. The predetermined size of the data blocks 206 may be, for example, 1 MB. The metadata region stores metadata blocks 208 describing a state of the data blocks 206. The size of the metadata block 208 corresponding to each data block 206 may be two bytes. A large-capacity storage device 108 requires a very large metadata region 204. For example, when the storage device 108 supports data capacity of 16 PB, the metadata region 204 is up to 32 GB. Since the space occupied by the metadata is very large, it can only be stored on disks, and cannot be stored in the memory 104. In an embodiment, the metadata region 204 is located at the end of each disk 110.

A logic unit space is formed when the RAID is created on the plurality of disks. These logic units each may be uniquely represented by a corresponding logic unit number (LUN). To achieve continuity of an RAID stripe, the LUN space needs to be zeroed. Zeroing of the disks of the LUN space needs take a long time period, for example, several hours. By marking, in the metadata, data blocks 206 on the disk 110 to be zeroed, and some background threads may perform zeroing operation on each disk 110.

In some embodiments, in addition to describing a zeroing state of each data block 206 and whether the data block needs to be zeroed with metadata, an overall checkpoint is used to describe a proportion of the disk that has already been zeroed. Usually, this checkpoint is not updated after each data block 206 is zeroed, so as to avoid increasing duration of the zeroing operation and causing larger impact on user I/O performances. Therefore, generally, the checkpoint is updated once after each predetermined time period.

The checkpoint may indicate a disk region that has already been zeroed. Such region may be called a disk region below the checkpoint. Regarding a disk region above the checkpoint, there are two cases: the first case is that a background zeroing thread has already completed the zeroing operation but the checkpoint is not updated in time, and the second case is that the disk region has not been zeroed. If a user's I/O is at a disk region below the checkpoint, the I/O may be performed according to a usual I/O operation, namely, accessing the disk in a usual mode to read/write data. When the I/O is at a disk region above the checkpoint, a zero on demand ZOD process needs to be performed. Accessing the I/O of the disk region above the checkpoint must first read the metadata to check a state of the data block of the region.

The zero on demand process is described as follows. Before read/write is performed for the data block 206 at the disk region above the checkpoint, it is necessary to read metadata corresponding to the data block 206 and check a zeroing state. For example, before the read operation is performed for the data block 206 at the disk region above the checkpoint, it is necessary to read metadata corresponding to the data block 206 and check a zeroing state. If the region is not yet zeroed, first the region is zeroed, then write operation is performed for the region, and finally the metadata corresponding to the region is updated to indicate that the region has already been zeroed. When read operation is performed for the disk region above the checkpoint, it is also necessary to read metadata of the data block 206. If the disk region is not yet zeroed, the read data is set to be zero. Otherwise, if the disk region has already completed the zeroing process, the read operation is performed for the disk to obtain data from the disk.

As described above, the zero on demand operation introduces a problem about increase or amplification of I/O. Regarding each read or write operation in the disk region, it is necessary to access metadata on the disk at least one time, which reduces the performance of user's I/O. Furthermore, if read/write are far away from each other, the disk average seek time will be increased substantially.

An exemplary embodiment of the present disclosure will be further described in detail with reference to FIG. 3 through FIG. 10. For ease of description, the manager 102 is taken as an example to discuss several exemplary embodiments of the present disclosure. However, it will be understood that features described hereunder are also applicable for one or more other managers.

Figure 3:
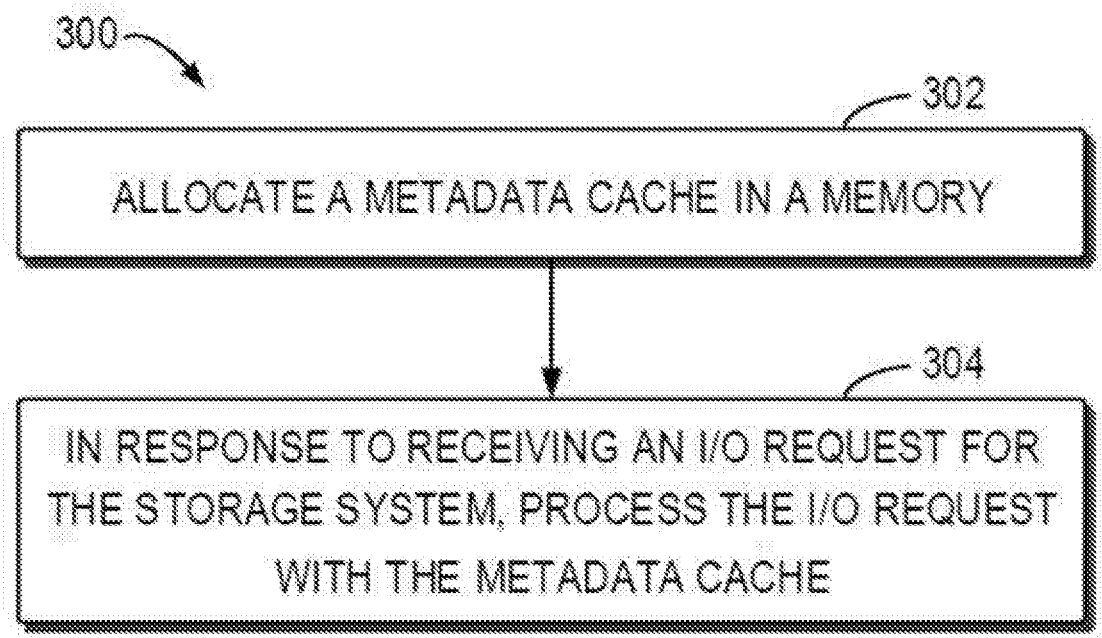
FIG. 3 illustrates a flow chart of a method for managing a storage system according to an embodiment of the present disclosure.

FIG. 3 illustrates a flow chart of a method 300 for managing a storage system 100 according to an embodiment of the present disclosure. It should be appreciated that the method 300 may further comprise additional steps not shown and/or shown actions may be omitted. The range of the present disclosure is not limited in this aspect.

Figure 4:
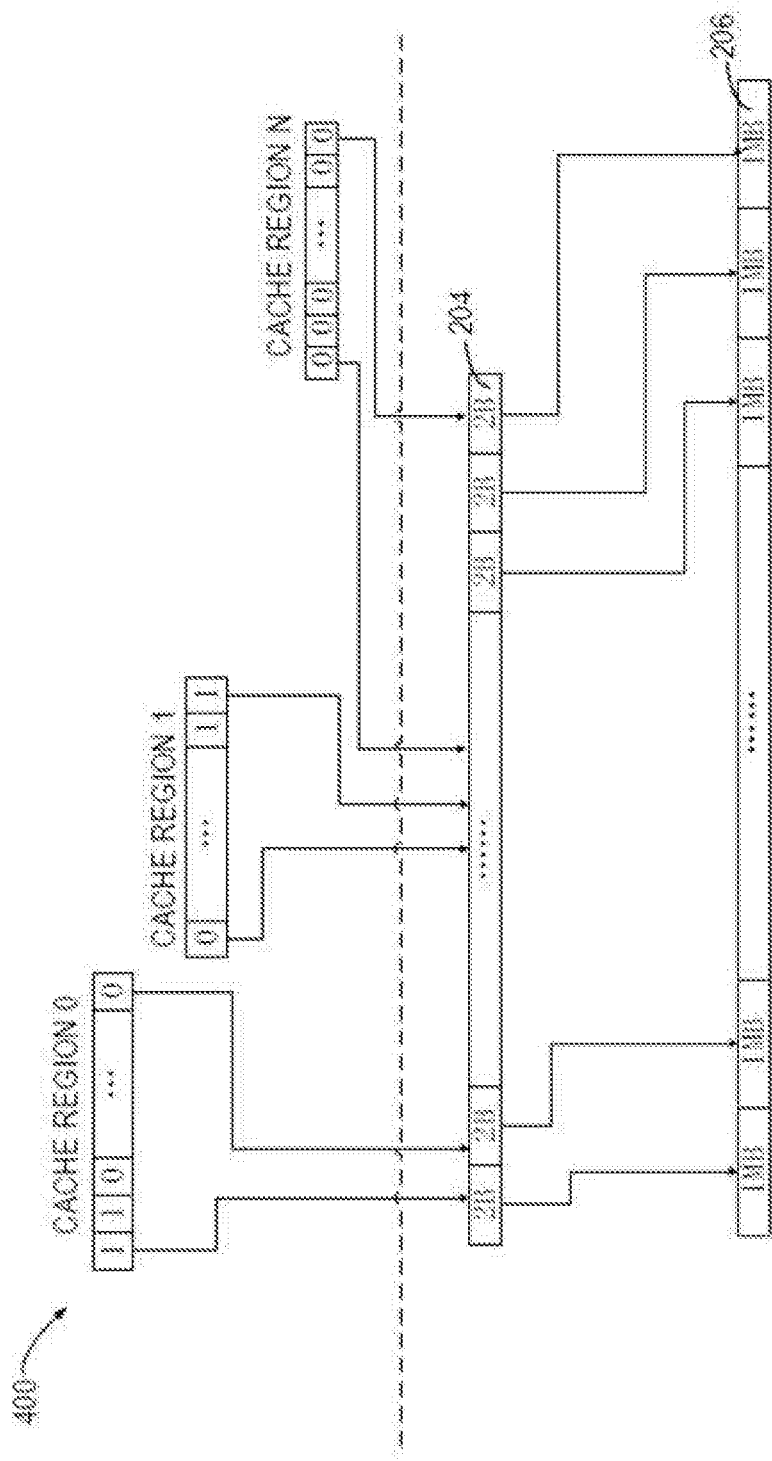
FIG. 4 illustrates a schematic diagram of allocating metadata cache according to an embodiment of the present disclosure.

At 302, the manager 102 allocates metadata cache in the memory 104. FIG. 4 shows a proportion of allocation of the metadata cache. More specifically, FIG. 4 illustrates a schematic diagram of allocating metadata cache according to an embodiment of the present disclosure. The metadata cache is designed as a plurality of cache regions, including cache region 0, cache region 1, up to cache region N, wherein N is a positive integer. The cache region is also called cache slot or cache segment. The metadata cache corresponds to a data block. The size of the cache region may be set as a target size, for example 128 bits. The metadata cache comprises a zeroing indication bit. The zeroing indication bit indicates a zeroing state of a corresponding data block. Each bit represents a state of a data block in the data region. In some embodiment, the size of the cache region is set as 128 bits with each bit corresponding to 2B metadata and 1 MB data block. According to limitation of the capacity of the memory 104 of the manager 102, the number of metadata caches is configurable. If four data cache regions are set, the size of each cache region is 128 bits, so as to enable description of zeroing state of 512 MB data.

The zeroing indication bit may be set as a predetermined value such as 1 or 0. As a non-restrictive implementation, the zeroing indication bit with value 1 indicates that the data block corresponding to the zeroing indication bit has already been zeroed or been written content by the user's I/O, which means a cache hit at this time. In the event of hit, the metadata corresponding to the indication bit needn't be read. The zeroing indication bit with the value 0 indicates that the state of the corresponding data block is unknown. The data block might be already zeroed, but the metadata cache has not been updated yet. The data block might not be zeroed or not written content. The indication bit with the value 0 means a cache miss. The metadata corresponding to the indication bit needs to be read to determine a real state of the corresponding data block. Referring to FIG. 4, a part of zeroing indication bits in the cache region 0 are set to be 0, and a part of the zeroing indication bits are set to be 0. According to the principle of locality, neighboring storage locations on the disk tend to be accessed frequently, which means a very large opportunity of disk hit.

In some embodiments, a range of each cache region does not overlap the range of other cache regions. To expedite disk zeroing, allocating the metadata cache includes allocating a user data cache for read or write of the user data and allocating a background zero cache for a background zeroing operation with respect to the storage device 108. In one embodiment, a metadata cache is set purposefully for the background zeroing operation, and other metadata caches are used for the user I/O, for example, four cache regions are set for the user data I/O.

In some embodiments, a definition of a data structure of the metadata cache is shown in Table 1. It is noted that values in Table 1 are only exemplary and not intended to limit the range of the present disclosure in any manner. Any other proper values may also be feasible according to specific implementation environments and demands.

TABLE 1

| Parameters | Description |
| --- | --- |
| cached_data[16] | 128-bit data, each bit corresponding to a data block 206 |
| start_chunk | An index of a first data block in the cache region |
| last_io | A count for the last I/O which is a hit in the cache region |

Returning to FIG. 3, at 304, in response to receiving an I/O request for the storage system 100, the manager 200 processes the I/O request with the metadata cache. The I/O request may come from a user equipment or a host. The I/O request may comprise a read request, a write request, a zero request and the like. In the case that the metadata cache hits, read/write operation for the disk may be directly performed. In the case that the metadata cache misses, the metadata needs to be read first. The procedure of processing I/O is exemplarily described below in conjunction with FIGS. 5-11.

In the solution of the present disclosure, regarding each time of read/write/zero hit, it is feasible to skip or omit read of the metadata one time, so half of disk operations may be saved. Regarding an unconsumed disk, namely, a disk that cannot be used for the user's read/write, the background zeroing operation updates all metadata and put them together, which may also save plenty of disk operations. In case that operations for the metadata reduce, it is more probable for the I/O to be directed to the same disk region, which substantially reduces seek time of the disk driver, thereby improving I/O performances. Regarding each time of read/write/zero miss, the IO service time is substantially consistent with the solution of not employing the metadata cache, because the solution of the present disclosure spends less time in read operation of the cache without increasing the read time of the disk.

Figure 5:
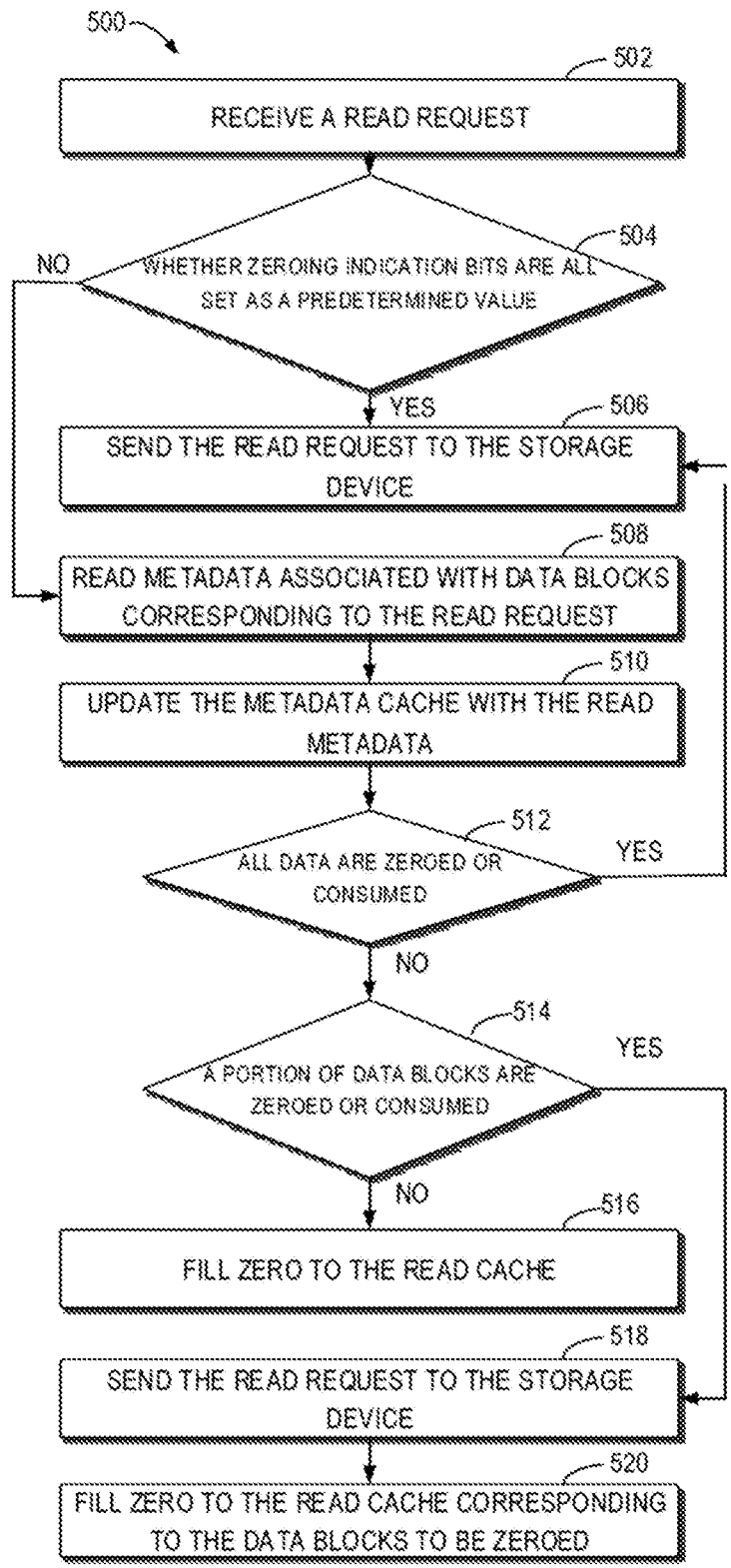
FIG. 5 illustrates a schematic diagram of a procedure of processing a read request according to an embodiment of the present disclosure.

FIG. 5 illustrates a schematic diagram of a procedure 500 of the manager 102 processing a read request according to an embodiment of the present disclosure. The read request belongs to a type of above-mentioned I/O requests.

At 502, the manager 102 receives a read request which may come from a user equipment or a host.

At 504, the manager 102 determines whether the zeroing indication bits in the metadata cache associated with the data block corresponding to the read request are all set as a predetermined value. In some embodiments, the predetermined value is set as 1.

At 506, the zeroing indication bits in the metadata cache associated with the data block corresponding to the read request are all set as the predetermined value, the manager 102 sends the read request to the storage device. The zeroing indication bits being all set as the predetermined value means that the data blocks corresponding to the zeroing indication bits all have been zeroed or written.

At 508, if at least one of the zeroing indication bits in the metadata cache associated with the data block corresponding to the read request is not set as the predetermined value, the manager 102 reads the metadata associated with the data block corresponding to the read request. With at least one of the zeroing indication bits not being set as the predetermined value, it means that at least part of data blocks in the data blocks corresponding to the zeroing indication bit is not zeroed or written, whereupon it is necessary to first read the metadata on the disk to determine the zeroing state of the data block.

At 510, the manager 102 updates the metadata cache with the read metadata. A specific implementation mode of updating the metadata cache will be described in more detail with reference to FIG. 8.

At 512, the manager 102 determines whether all data blocks have already been zeroed or written. Step 506 is performed in case that all data blocks have already been zeroed or written.

In case that not all data blocks have already been zeroed or written, 514 is performed in which the manager 102 determines whether a portion of data blocks have been zeroed or written.

If the manager 102 determines that there is not a portion of data blocks zeroed or written at 514, the flow proceeds to 516, namely, the manager 102 fills 0 to the read cache. That is, the data obtained by the read request is filled as 0.

If the manager 102 determines that a portion of data blocks have already been zeroed or written at 514, the flow will proceed to 518 in which the manager 102 sends the read request to the storage device 108. That is, the manager 102 reads the data blocks that have already been zeroed or written.

At 520, the manager 102 fills 0 to the read cache corresponding to the data block that needs zeroing. That is, the manager 102 fills the cache corresponding to the read request as 0, with respect to data locks that are not zeroed or written.

Figure 6:
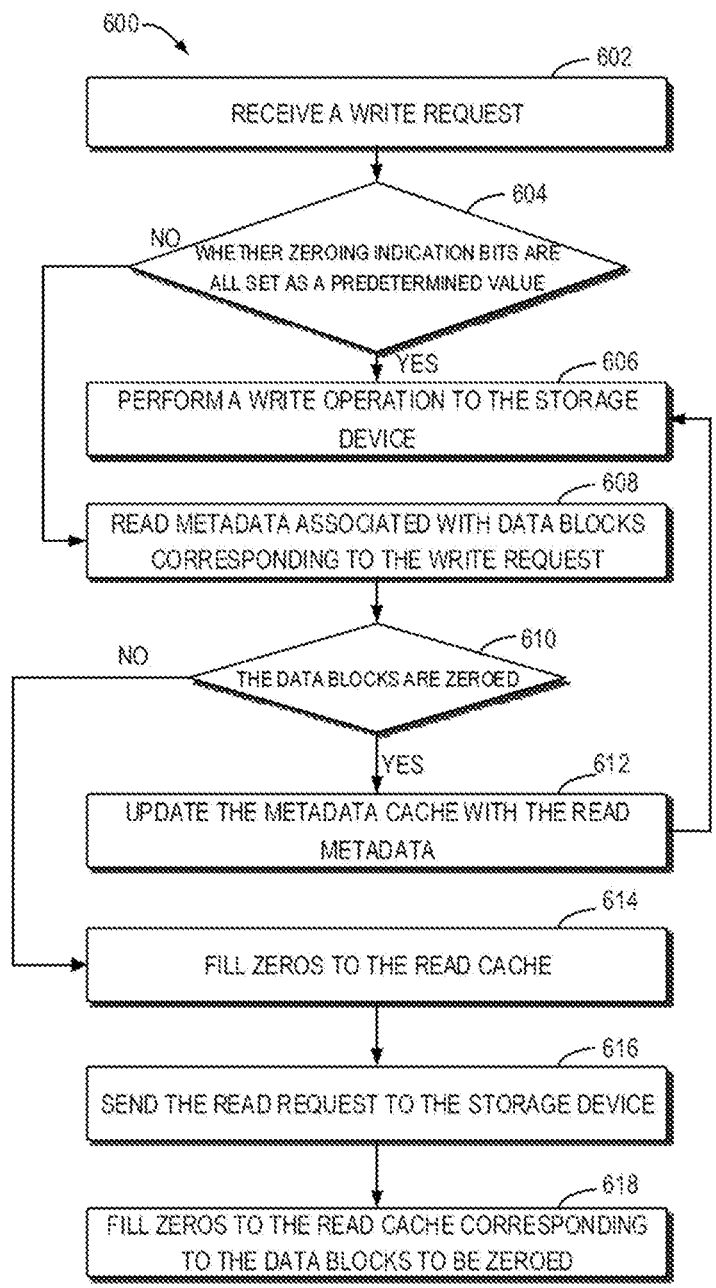
FIG. 6 illustrates a schematic diagram of a procedure of processing a write request according to an embodiment of the present disclosure.

FIG. 6 illustrates a schematic diagram of a procedure 600 of the manager 102 processing a write request according to an embodiment of the present disclosure. The write request belongs to a type of the above-mentioned I/O requests.

At 602, the manager 102 receives a write request which for example may come from a user equipment or a host.

At 604, the manager 102 determines whether the zeroing indication bits in the metadata cache associated with the data block corresponding to the write request are all set as a predetermined value. In some embodiments, the predetermined value is set as 1.

At 606, if the zeroing indication bits in the metadata cache associated with the data block corresponding to the write request are all set as the predetermined value, the manager 102 performs write operation to the storage device.

At 608, if at least one of the zeroing indication bits in the metadata cache associated with the data block corresponding to the write request is not set as the predetermined value, the manager 102 reads the metadata associated with the data block corresponding to the write request.

At 610, the manager 102 determines whether the data block is zeroed.

At 612, if the data block is zeroed, the manager 102 updates the metadata cache associated with the data block corresponding to the write request with the read metadata. After 612, step 606 is performed, namely, the write operation to the storage device is performed.

At 614, if the data is not zeroed, the manager 102 fills the read cache with zero.

At 616, the manager 102 sends the read request to the storage device 108.

At 618, the manager 102 fills 0 to the read cache corresponding to the data block to be zeroed.

Figure 7:
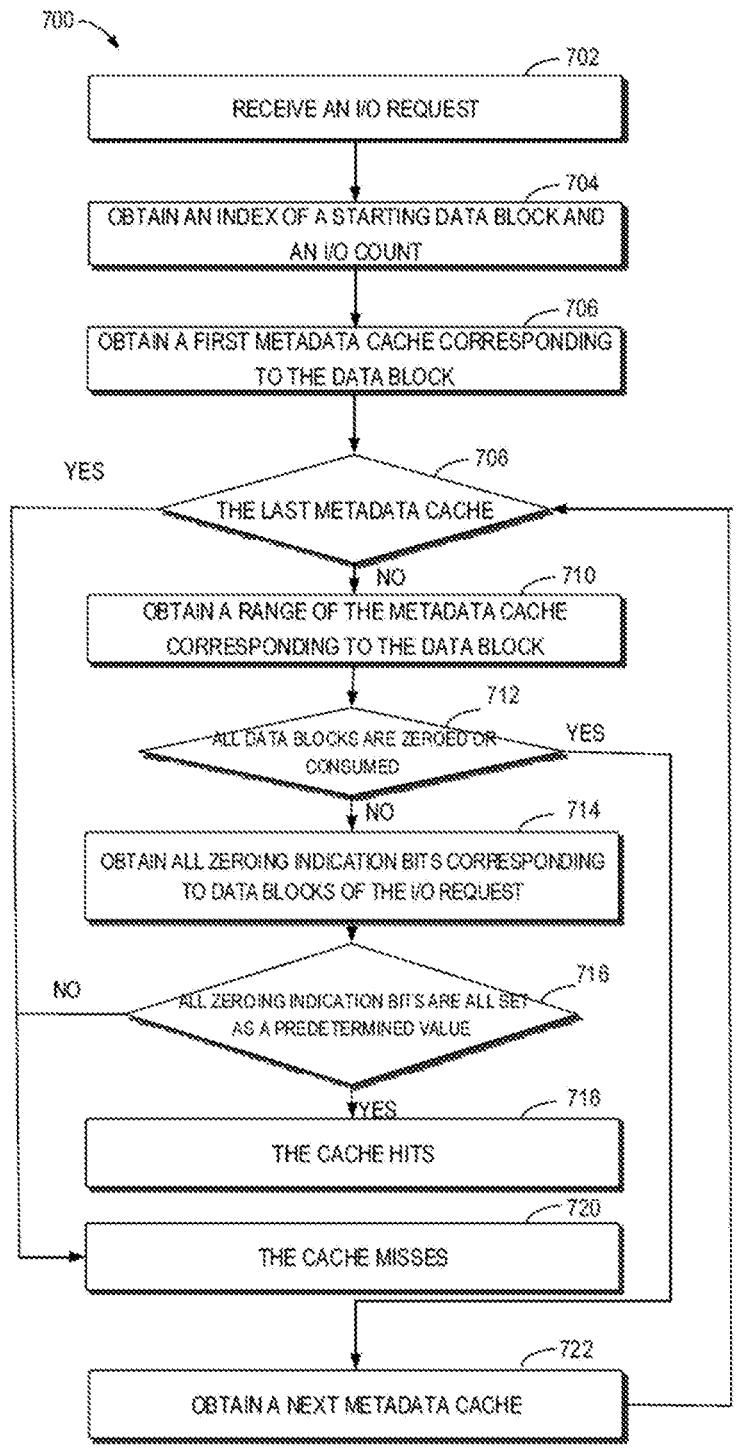
FIG. 7 illustrates a schematic diagram of a procedure of looking up metadata cache according to an embodiment of the present disclosure.

FIG. 7 illustrates a schematic diagram of a procedure 700 of looking up metadata cache according to an embodiment of the present disclosure. Before the I/O operation is performed for the data block 206 on the disk, a lookup operation is first performed according to the metadata cache stored in the memory 104. The data block corresponding to the I/O request might correspond to a metadata cache or to a plurality of metadata caches or to no metadata caches. Before the zeroing indication bit is read, first it is necessary to find a location of the zeroing indication bit in the memory 104.

At 702, the manager 102 receives an I/O request which may be a read request, a write request, or a zero request.

At 704, the manager 102 obtains an index of a starting data block and an I/O count, namely, make the user's I/O request correspond to a starting index number and the number of data blocks.

At 706, the manager 102 obtains a first metadata cache corresponding to the data block.

At 708, the manager 102 determines whether it is the last metadata cache. In case that the judgment result of 708 is positive, the zeroing indication bit corresponding to the I/O request is not stored in the data cache region, whereupon the flow proceeds to step 720.

At 710, the manager 102 obtains a range of metadata cache corresponding to the data block.

At 712, the manager 102 determines whether all data blocks are zeroed or written.

At 714, when the judgment result at 712 is negative, the manager 102 obtains all zeroing indication bits corresponding to the data block of the I/O request.

At 716, the manager 102 determines that all zeroing indication bits are set as a predetermined value.

At 718, if the judgment result of 716 is positive, then the cache hits, whereupon the manager 102 need not read the metadata.

At 720, if the judgment result of 716 is negative, then the cache misses, and the manager 102 needs to first read metadata. In case that the judgment result of 708 is negative, the flow proceeds to step 710.

At 722, if the judgment result of 712 is positive, the manager 102 obtains next metadata cache.

Figure 8:
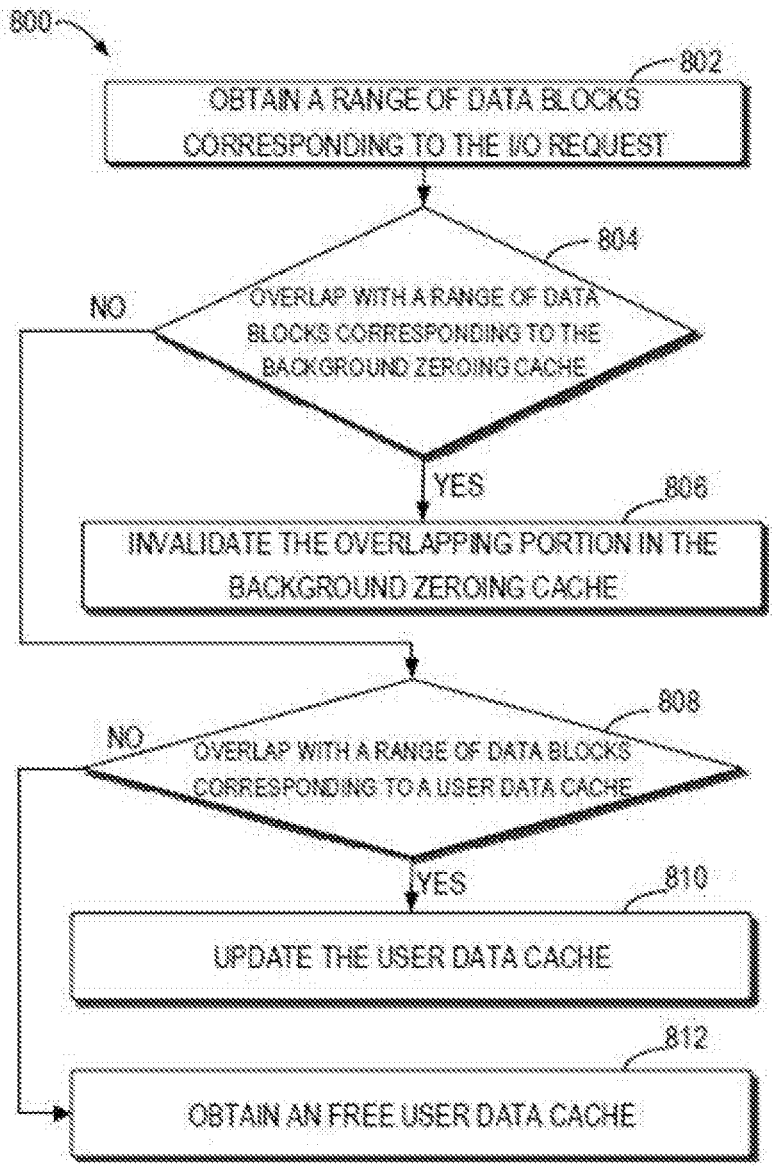
FIG. 8 illustrates a schematic diagram of a procedure of updating metadata cache according to an embodiment of the present disclosure.

FIG. 8 illustrates a schematic diagram of a procedure 800 of the manager 102 updating metadata cache according to an embodiment of the present disclosure. The updating procedure shown in FIG. 8 may be a procedure of refining the step 612 in FIG. 6. It should be appreciated that the procedure of updating the metadata cache described in the present disclosure all may use the procedure 800.

At 802, the manager 102 obtains a range of data blocks corresponding to the I/O request.

At 804, the manager 102 determines whether the range of data blocks corresponding to the I/O request overlaps a range of data blocks corresponding to a background zero cache.

At 806, if the range of data blocks corresponding to the I/O request overlaps the range of data blocks corresponding to the background zero cache, the manager 102 invalidates the overlapping portion in the background zero cache.

At 808, if the range of data blocks corresponding to the I/O request does not overlap the range of data blocks corresponding to the background zero cache, the manager 102 determines whether the range of data blocks corresponding to the I/O request overlaps the use data cache.

At 810, if the range of data blocks corresponding to the I/O request overlaps the range of data blocks corresponding to the user data cache, the manager 102 updates the user data cache.

At 812, if the range of data blocks corresponding to the I/O request does not overlap the range of data blocks corresponding to the user data cache, the manager 102 obtains a free user data cache.

In some embodiments, the manager 102 obtaining the free user data cache includes first judging whether there exists a free cache region. When the free cache region exists, the cache region is initialized, and a starting portion of the cache region is set as the range of data blocks corresponding to the I/O request. When the free cache region does not exist, all cache regions are traversed to determine a least-recently-used (LRU) cache region, and judgment is made as to whether the LRU cache region is hit in recent 100 times of I/O procedures. If the LRU cache region is ever hit in the recent 100 times of I/O procedures, the updating procedure of this time is completed. If the LRU cache region does not hit in the recent 100 times of I/O procedures, the LRU cache region is invalidated, then the cache region is initialized, and the starting portion of the cache region is set as the range of data blocks corresponding to the I/O request. It should be appreciated that 100 times is only exemplary times, and it is feasible to judge whether to invalidate the LRU cache region based on other set times threshold. Misses beyond the threshold number of times indicates that data blocks corresponding to the cache is of lower hotness, and the cache region may be used to represent a state of other data blocks with higher hotness.

Figure 9:
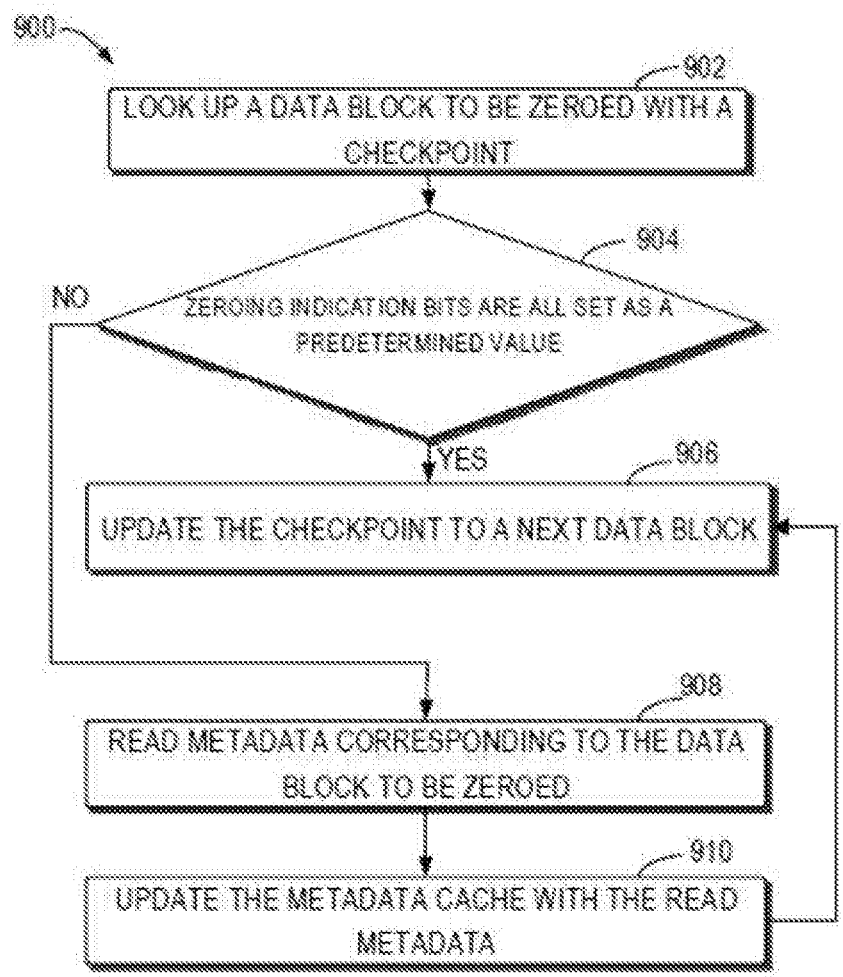
FIG. 9 illustrates a schematic diagram of a background zeroing procedure according to an embodiment of the present disclosure.

FIG. 9 illustrates a schematic diagram of a background zero procedure 900 according to an embodiment of the present disclosure. The background zero procedure may occur in the initialization procedure of the storage system 100 or in the initialization procedure of a certain disk 110. The disk 110 may be in a consumed or unconsumed state. The background zero procedure of the disk in the consumed or unconsumed state is further described with reference to FIGS. 10 and 11.

At 902, the manager 102 look up the data block to be zeroed with the checkpoint, the checkpoint indicating an index of the data block to be zeroed.

At 904, the manager 102 determines whether zeroing indication bits in the background zero cache corresponding to the data block to be zeroed are all set as a predetermined value.

If at 904 the manager 102 determines that zeroing indication bits in the background zero cache associated with the data block to be zeroed are all set as the predetermined value, the flow proceeds to 906, and the manager 102 updates the checkpoint to next data block.

If at 904 the manager 102 determines that at least one of the zeroing indication bits in the background zero cache associated with the data block to be zeroed is not set as the predetermined value, the flow proceeds to 908, and the manager 102 reads the metadata corresponding to the data block to be zeroed.

At 910, the manger 102 updates the metadata cache with the read metadata. After 910, the flow proceeds to 906 where the manager 102 updates the checkpoint to next data block.

Figure 10:
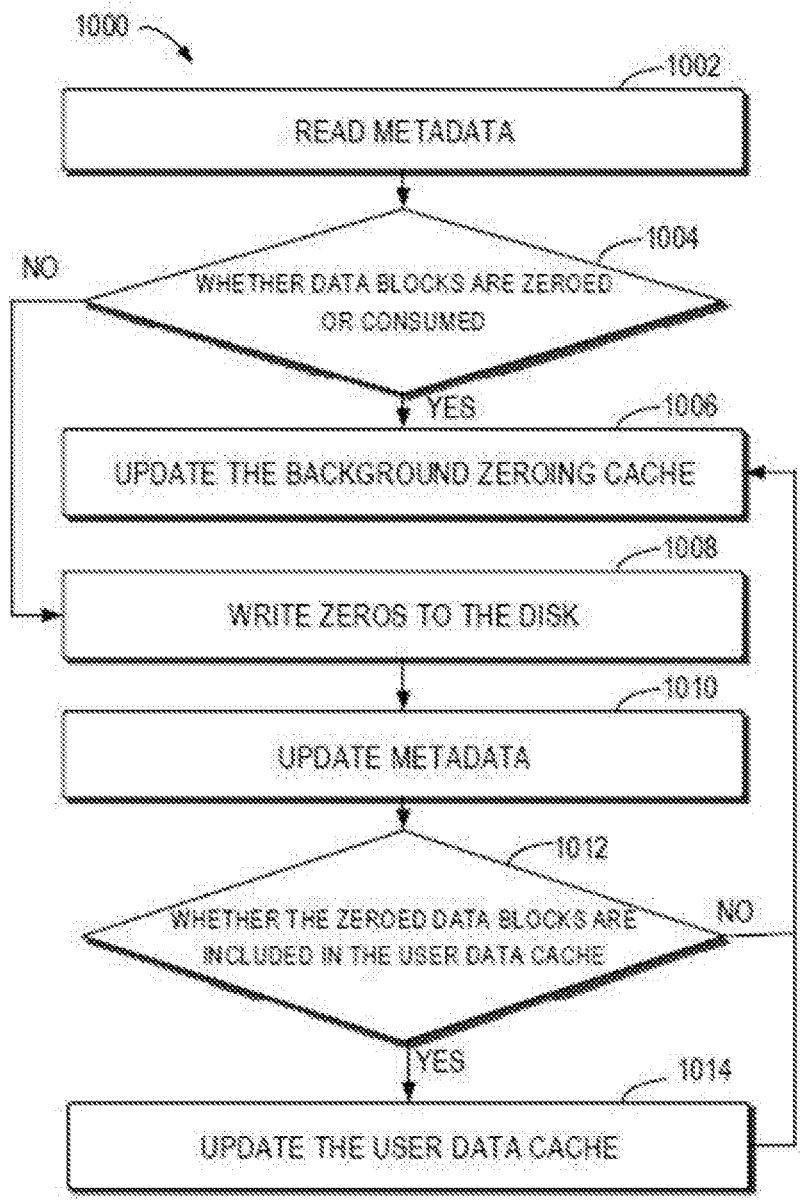
FIG. 10 illustrates a schematic diagram of a background zeroing procedure according to another embodiment of the present disclosure.

FIG. 10 illustrates a schematic diagram 1000 of a background zero procedure according to another embodiment of the present disclosure. In the solution of FIG. 10, the user data I/O and the background zero with respect to the disk both proceed, namely, the disk is consumed. The solution corresponds to the case in which at least one of the zeroing indication bits in the background zero cache associated with the data block to be zeroed is not set as the predetermined value in the solution of FIG. 9.

At 1002, the manager 102 reads metadata.

At 1004, the manager 102 determines whether the data block is zeroed or written.

If at 1004 the manager 102 determines that the data block is zeroed or written, the flow proceeds to 1006 where the manager 102 updates the background zeroing cache.

If at 1004 the manager 102 determines that the data block is not zeroed or written, the flow proceeds to 1008 where the manager 102 writes 0 to the disk.

At 1010, the manager 102 updates the metadata.

At 1012, the manager 102 determines whether the data block to be zeroed is included in the user data cache.

If at 1012 the manager 102 determines the data block to be zeroed is included in the user data cache, the flow proceeds to 1014 where the manager 102 updates the user data cache, and then proceeds to 1006.

If at 1012 the manager 102 determines the data block to be zeroed is not included in the user data cache, the flow proceeds to 1006.

Figure 11:
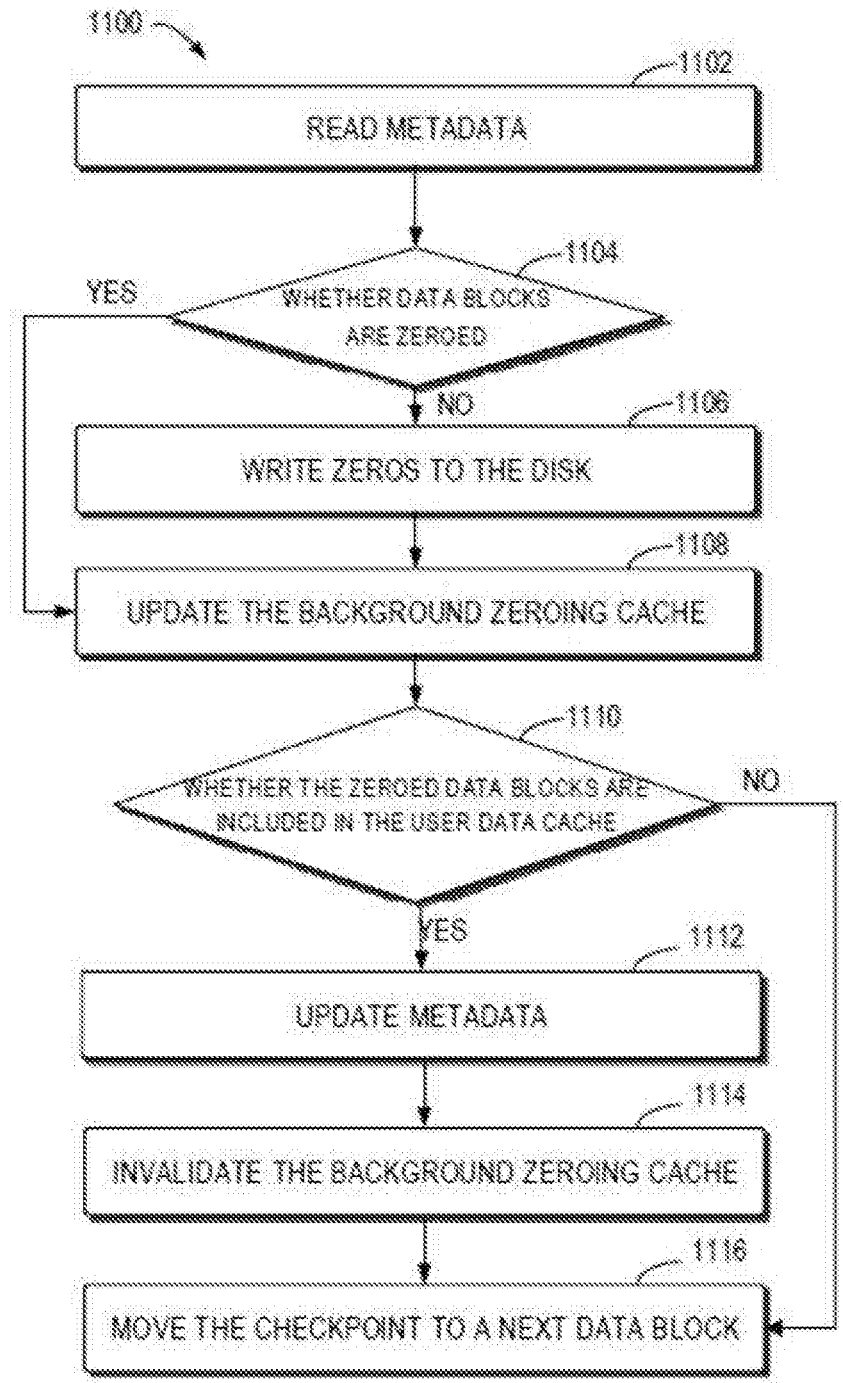
FIG. 11 illustrates a schematic diagram of a background zeroing procedure according to a further embodiment of the present disclosure.

FIG. 11 illustrates a schematic diagram 1100 of a background zero procedure according to another embodiment of the present disclosure. In the solution of FIG. 11, the disk is not consumed, namely, there does not exist the user data I/O, and the background zeroing procedure at this time is described below. The solution corresponds to the case in which at least one of the zeroing indication bits in the background zero cache associated with the data block to be zeroed is not set as the predetermined value in the solution of FIG. 9.

At 1102, the manager 102 reads metadata.

At 1104, the manager 102 determines whether the data block is zeroed or consumed.

If at 1104 the manager 102 determines that the data block is zeroed or consumed, the flow proceeds to 1106 where the manager 102 writes 0 to the disk.

At 1108, the manager 102 updates the background zero cache.

If the manager 102 determines that the data block is not zeroed or consumed at 1104, the flow proceeds to 1108.

At 1110, the manager 102 determines whether the data block to be zeroed is included in the user data cache.

If at 1110 the manager 102 determines the data block to be zeroed is included in the user data cache, the flow proceeds to 1112 where the manager 102 updates the metadata.

At 1114, the manager 102 invalidate the background zero cache.

At 1116, the manager 102 moves the checkpoint to next data block.

Figure 12:
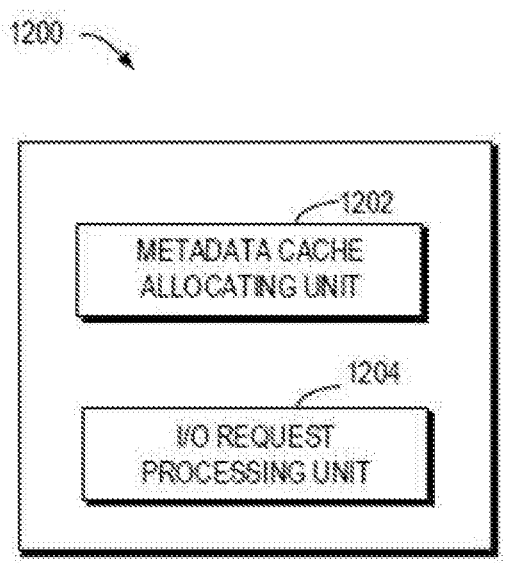
FIG. 12 illustrates a schematic diagram of a manager according to an embodiment of the present disclosure.

FIG. 12 illustrates a schematic diagram of an apparatus for managing the storage system according to an embodiment of the present disclosure. In some embodiments, the apparatus 1200 for example may be implemented on the manager 102. It may be appreciated that the block diagram is presented only to enable easier understanding of the present disclosure, not to limit implementations of the present disclosure. The apparatus 1200 may further comprise additional modules not shown and/or the shown modules may be omitted.

The apparatus 1200 comprises a metadata cache allocating unit 1202 and an I/O processing unit 1204. The metadata cache allocating unit 1202 is configured to allocate the metadata cache in the memory 104 of the manager 102. The metadata cache 204 comprises zeroing indication bits, and the zeroing indication bits indicate a zeroing state corresponding to the data block 206. The allocation procedure comprises allocating a user data cache for read or write of the user data and allocating a background zero cache for a background zeroing operation with respect to the storage device 108. The I/O request processing unit 1204 is configured to, in response to receiving an I/O request for the storage system 100, use the metadata cache to process the I/O request.

In some embodiments, the I/O request processing unit 1204 comprises a read request processing subunit. The read request processing subunit is configured to, in response to the I/O request being a read request, determine whether zeroing indication bits in the metadata cache associated with the data block corresponding to the read request are all set as a predetermined value; and in response to the zeroing indication bits in the metadata cache associated with the data block corresponding to the read request being all set as the predetermined value, send the read request to the storage device 108.

In some embodiments, the read request processing subunit is further configured to, in response to at least one of the zeroing indication bits in the metadata cache associated with the data block corresponding to the read request being not set as the predetermined value, read metadata associated with the data block corresponding to the read request; and update the metadata cache with the read metadata.

In some embodiments, the I/O request processing unit 1204 comprises a write request processing subunit. The write request processing subunit is configured to, in response to the I/O request being a write request, determine whether zeroing indication bits in the metadata cache associated with the data block corresponding to the write request are all set as a predetermined value; and in response to the zeroing indication bits in the metadata cache associated with the data block corresponding to the write request being all set as the predetermined value, perform a write operation to the storage device 108.

In some embodiments, the write request processing subunit is further configured to, in response to at least one of the zeroing indication bits in the metadata cache associated with the data block corresponding to the write request being not set as the predetermined value, read the metadata associated with the data block corresponding to the write request; and update the metadata cache associated with the data block corresponding to the write request with the read metadata.

In some embodiments, the write request processing subunit is further configured to, determine whether the data block corresponding to the write request has already been zeroed; in response to the data block corresponding to the write request has not been zeroed, zero the data block corresponding to the write request; perform a write operation to the storage device; update the metadata associated with the data block corresponding to the write request; and update the metadata cache associated with the data block corresponding to the write request.

In some embodiments, the I/O request processing unit 1204 comprises an update subunit. The updating subunit is configured to: obtains a range of data blocks corresponding to the I/O request; determine whether the range of data blocks corresponding to the I/O request overlaps a range of data blocks corresponding to a background zero cache; in response to the range of data blocks corresponding to the I/O request overlapping the range of data blocks corresponding to the background zero cache, invalidate the overlapping portion in the background zero cache; and in response to the range of data blocks corresponding to the I/O request not overlapping the range of data blocks corresponding to the background zero cache, determine whether the range of data blocks corresponding to the I/O request overlaps the use data cache.

In some embodiments, the updating subunit is further configured to: in response to the range of data blocks corresponding to the I/O request overlapping the range of data blocks corresponding to the user data cache, update the user data cache; in response to the range of data blocks corresponding to the I/O request not overlapping the range of data blocks corresponding to the user data cache, obtain a free user data cache.

In some embodiments, the I/O request processing unit 1204 comprises a zeroing subunit. The zeroing subunit is configured to: look up data blocks to be zeroed with the checkpoint, the checkpoint indicating an index of data blocks to be zeroed; determine whether zeroing indication bits in the background zero cache corresponding to data blocks to be zeroed are all set as a predetermined value; and in response to the zeroing indication bits in the background zero cache associated with data blocks to be zeroed being all set as the predetermined value, update the checkpoint to next data block.

In some embodiments, the zeroing subunit is further configured to: in response to at least one of the zeroing indication bits in the background zero cache associated with the data block to be zeroed being not set as the predetermined value, read the metadata corresponding to the data block to be zeroed; and update the metadata cache with the read metadata.

For the sake of clarity, FIG. 12 does not show some optional modules of the apparatus 1200. However, it should be understood that various features described above with reference to FIGS. 1-2 are also applicable to the apparatus 1200. Moreover, various modules of the apparatus 1200 may be hardware modules or software modules. For example, in some embodiments, the apparatus 1200 may be partially or completely implemented using software and/or firmware, e.g., implemented as a computer program product embodied on a computer readable medium. Alternatively or additionally, the apparatus 1200 may be partially or completely implemented based on hardware, e.g., implemented as an integrated circuit (IC), an application-specific integrated circuit (ASIC), a system on chip (SOC), a field programmable gate array (FPGA), etc. The range of the present disclosure will not be limited in this aspect.

Figure 13:
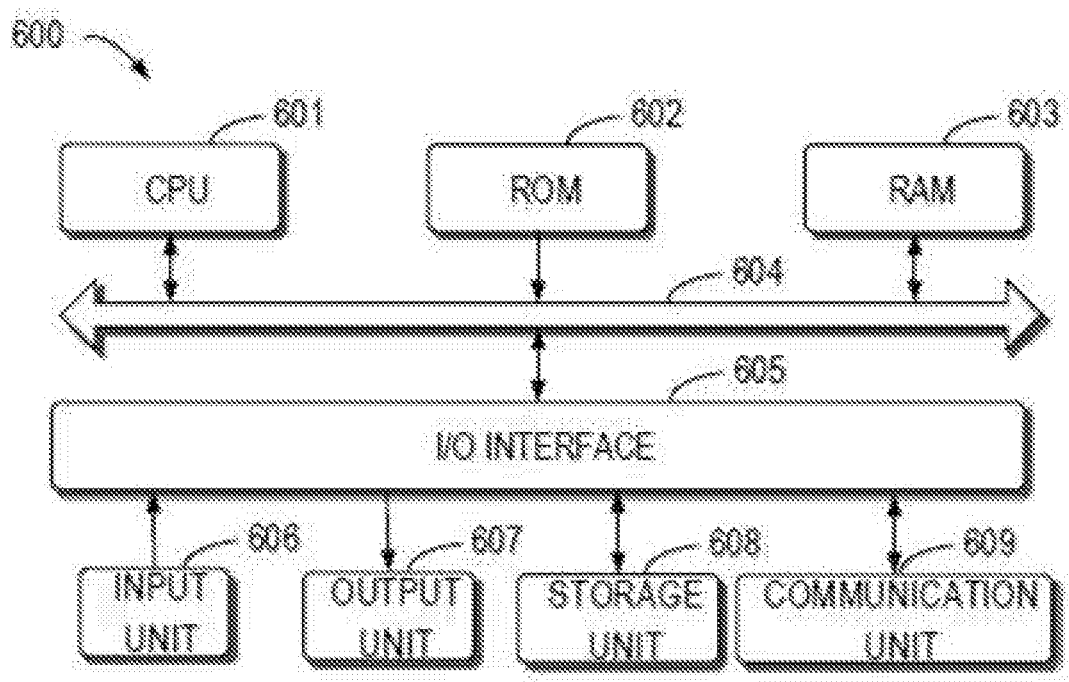
FIG. 13 illustrates a schematic block diagram of an exemplary device that can be used to implement embodiments of the present disclosure.

FIG. 13 is a schematic block diagram of an apparatus 1300 that may be used to implement the embodiments of the present disclosure. As shown in FIG. 13, the apparatus 1300 comprises a central processing unit (CPU) 1301 that may perform various appropriate actions and processing based on computer program instructions stored in a read-only memory (ROM) 1302 or computer program instructions loaded from a memory unit 1308 to a random access memory (RAM) 1303. In the RAM 1303, there further store various programs and data needed for operations of the apparatus 1300. The CPU 1301, ROM 1302, and RAM 1303 are connected to each other via a bus 1304. An input/output (I/O) interface 1305 is also connected to the bus 1304.

Various components in the apparatus 1300 are connected to the I/O interface 1305, including: an input 1306 such as a keyboard, a mouse, and the like; an output unit 1307 including various kinds of displays and a loudspeaker and the like; a memory unit 1308 including a magnetic disk, an optical disk, and the like; a communication unit 1309 including a network card, a modem, and a wireless communication transceiver, and the like. The communication unit 1309 allows the apparatus 1300 to exchange information/data with other devices through a computer network such as the Internet and/or various kinds of telecommunications networks.

Various processes and processing described above, e.g., method 300, 500, 600, 700, 800 or 900, may be executed by the processing unit 1301. For example, in some embodiments, the method 300, 500, 600, 700, 800 or 900 may be implemented as a computer software program that is tangibly embodied on a machine readable medium, e.g., the storage unit 1308. In some embodiments, a part or all the computer program may be loaded and/or mounted onto the apparatus 1300 via ROM 1302 and/or communication unit 1309. When the computer program is loaded to the RAM 1303 and executed by the CPU 1301, one or more steps of the method 200 or 300 as described above may be executed. Alternatively, in other embodiments, CPU 1301 may also be configured in any other suitable manners to implement the above procedure/method.

In the present disclosure, the metadata cache is introduced in the memory to map the metadata on the disk. The solution of the present disclosure may achieve the following technical effects: cache uses less storage space to describe and maintain the metadata on the disk. When the metadata cache is hit, times of access to the disk may be reduced, and therefore to-and-fro movement of the disk head between the data and metadata may be avoided. Furthermore, the solution of the present disclosure may accelerate the background zeroing operation. The metadata cache in the memory may be used to perform uniform update for metadata changes, rather than updating metadata for each time of data block change during initialization of the disk.

The present disclosure may be a method, apparatus, system and/or computer program product. The computer program product may include a computer readable medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act as specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the range and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a storage system, the storage system including a manager and a storage device, the storage device including a data region being divided into data blocks and a metadata region storing metadata describing zeroing states of the data blocks, the method comprising:
    allocating a metadata cache in a memory of the manager, the metadata cache including respective zeroing indication bits indicative of the zeroing states of the corresponding data blocks, the allocating comprising:
        allocating a user data cache for reading or writing user data, and
        allocating a background zeroing cache for a background zeroing operation of the storage device; and
    in response to receiving an I/O request for the storage system, processing the I/O request with the metadata cache.

2. The method of claim 1, wherein processing the I/O request with the metadata cache comprises:
    in response to the I/O request being a read request, determining whether zeroing indication bits in the metadata cache associated with data blocks corresponding to the read request are all set as a predetermined value; and
    in response to the zeroing indication bits in the metadata cache associated with the data blocks corresponding to the read request being all set as the predetermined value, sending the read request to the storage device.

3. The method of claim 2, further comprising:
    in response to at least one of the zeroing indication bits in the metadata cache associated with the data blocks corresponding to the read request being not set as the predetermined value,
        reading metadata associated with the data blocks corresponding to the read request; and
        updating the metadata cache with the read metadata.

4. The method of claim 1, wherein updating the metadata cache with the read metadata comprises:
    in response to the I/O request being a write request, determining whether zeroing indication bits in the metadata cache associated with the data blocks corresponding to the write request are all set as a predetermined value; and
    in response to the zeroing indication bits in the metadata cache associated with the data blocks corresponding to the write request being all set as the predetermined value, performing a write operation to the storage device.

5. The method of claim 4, further comprising:
    in response to at least one of the zeroing indication bits in the metadata cache associated with the data blocks corresponding to the write request being not set as the predetermined value,
        reading metadata associated with the data blocks corresponding to the write request; and
        updating, with the read metadata, the metadata cache associated with the data blocks corresponding to the write request.

6. The method of claim 5, wherein updating, with the read metadata, the metadata cache associated with the data blocks corresponding to the write request comprises:
    determining whether the data blocks corresponding to the write request have been zeroed; and in response to the data blocks corresponding to the write request having not been zeroed,
zeroing the data blocks corresponding to the write request;
performing a write operation to the storage device;
updating the metadata associated with the data blocks corresponding to the write request; and
updating the metadata cache associated with the data blocks corresponding to the write request.

7. The method of claim 1, wherein processing the I/O request with the metadata cache comprises:
obtaining a range of data blocks corresponding to the I/O request;
determining whether the range of data blocks corresponding to the I/O request overlaps with a range of data blocks corresponding to the background zeroing cache;
in response to the range of data blocks corresponding to the I/O request overlapping with the range of data blocks corresponding to the background zeroing cache, invalidating the overlapping portion in the background zeroing cache; and
in response to the range of data blocks corresponding to the I/O request not overlapping with the range of data blocks corresponding to the background zeroing cache, determining whether the range of data blocks corresponding to the I/O request overlaps with the user data cache.

8. The method of claim 7, further comprising:
in response to the range of data blocks corresponding to the I/O request overlapping with the range of data blocks corresponding to the user data cache, updating the user data cache; and
in response to the range of data blocks corresponding to the I/O request not overlapping with the range of data blocks corresponding to the user data cache, obtaining a free user data cache.

9. The method of claim 1, wherein the background zeroing operation comprises:
looking up a data block to be zeroed with a checkpoint, the checkpoint indicating an index of the data block to be zeroed;
determining whether zeroing indication bits in the background zeroing cache corresponding to the data block to be zeroed are all set as a predetermined value; and
in response to the zeroing indication bits in the background zeroing cache associated with the data block to be zeroed being all set as the predetermined value, updating the checkpoint to a next data block.

10. The method of claim 9, further comprising:
in response to at least one of the zeroing indication bits in the background zeroing cache associated with the data block to be zeroed being not set as the predetermined value,
reading metadata corresponding to the data block to be zeroed; and
updating the metadata cache with the read metadata.

11. A manager for managing a storage system, the storage system including the manager and a storage device, the storage device including a data region and a metadata region, the data region being divided into data blocks, the metadata region storing metadata describing zeroing states of the data blocks, the manager including a processor and a memory coupled to the processor and having instructions stored thereon, the instructions, when executed by the processor, causing the manager to perform acts including:
allocating a metadata cache in the memory, the metadata cache including respective zeroing indication bits indicative of the zeroing states of the corresponding data blocks, the allocating comprising:
allocating a user data cache for reading or writing user data, and
allocating a background zeroing cache for a background zeroing operation of the storage device; and
in response to receiving an I/O request for the storage system, processing the I/O request with the metadata cache.

12. The manager of claim 11, wherein processing the I/O request with the metadata cache comprises:
in response to the I/O request being a read request, determining whether zeroing indication bits in the metadata cache associated with the data blocks corresponding to the read request are all set as a predetermined value; and
in response to the zeroing indication bits in the metadata cache associated with the data blocks corresponding to the read request being all set as the predetermined value, sending the read request to the storage device.

13. The manager of claim 12, wherein the acts further include:
in response to at least one of the zeroing indication bits in the metadata cache associated with the data blocks corresponding to the read request being not set as the predetermined value,
reading metadata associated with the data blocks corresponding to the read request; and
updating the metadata cache with the read metadata.

14. The manager of claim 11, wherein updating the metadata cache with the read metadata comprises:
in response to the I/O request being a write request, determining whether zeroing indication bits in the metadata cache associated with the data blocks corresponding to the write request are all set as a predetermined value; and
in response to the zeroing indication bits in the metadata cache associated with the data blocks corresponding to the write request being all set as the predetermined value, performing a write operation to the storage device.

15. The manager of claim 14, the acts further comprising:
in response to at least one of the zeroing indication bits in the metadata cache associated with the data blocks corresponding to the write request being not set as the predetermined value,
reading metadata associated with the data blocks corresponding to the write request; and
updating, with the read metadata, the metadata cache associated with the data blocks corresponding to the write request.

16. The manager of claim 15, wherein updating, with the read metadata, the metadata cache associated with the data blocks corresponding to the write request comprises:
determining whether the data blocks corresponding to the write request have been zeroed; and
in response to the data blocks corresponding to the write request having not been zeroed,
zeroing the data blocks corresponding to the write request;
performing a write operation to the storage device;
updating the metadata associated with the data blocks corresponding to the write request; and
updating the metadata cache associated with the data blocks corresponding to the write request.

17. The manager of claim 11, wherein processing the I/O request with the metadata cache comprises:

obtaining a range of data blocks corresponding to the I/O request;

determining whether the range of data blocks corresponding to the I/O request overlaps with a range of data blocks corresponding to the background zeroing cache;

in response to the range of the data blocks corresponding to the I/O request overlapping with the range of the data blocks corresponding to the background zeroing cache, invalidating the overlapping portion in the background zeroing cache; and in response to the range of the data blocks corresponding to the I/O request not overlapping with the range of the data blocks corresponding to the background zeroing cache, determining whether the range of the data blocks corresponding to the I/O request overlaps with the user data cache.

18. The manager of claim 17, further comprising:

in response to the range of the data blocks corresponding to the I/O request overlapping with the range of the data blocks corresponding to the user data cache, updating the user data cache; and in response to the range of the data blocks corresponding to the I/O request not overlapping with the range of the data blocks corresponding to the user data cache, obtaining a free user data cache.

19. The manager of claim 11, wherein the background zeroing operation comprises:

looking up a data block to be zeroed with a checkpoint, the checkpoint indicating an index of the data block to be zeroed;

determining whether zeroing indication bits in the background zeroing cache corresponding to the data block to be zeroed are all set as a predetermined value; and in response to the zeroing indication bits in the background zeroing cache associated with the data block to be zeroed being all set as the predetermined value, updating the checkpoint to a next data block.

20. The manager of claim 19, wherein the background zeroing operation comprises:

in response to at least one of the zeroing indication bits in the background zeroing cache associated with the data block to be zeroed being not set as the predetermined value, reading the metadata corresponding to the data block to be zeroed; and updating the metadata cache with the read metadata.

* * * * *